US010057640B2

(12) United States Patent
Oshima et al.

(10) Patent No.: US 10,057,640 B2
(45) Date of Patent: Aug. 21, 2018

(54) MEDIA CONTENT MIGRATION BASED ON USER LOCATION

(71) Applicant: Google Inc., Mountain View, CA (US)

(72) Inventors: Mitsuru Oshima, San Jose, CA (US); Alexander Friedrich Kuscher, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/828,438

(22) Filed: Aug. 17, 2015

(65) Prior Publication Data

US 2017/0055032 A1    Feb. 23, 2017

(51) Int. Cl.
*H04N 21/442*    (2011.01)
*H04L 29/06*     (2006.01)
*H04N 21/258*    (2011.01)
*H04N 21/436*    (2011.01)

(52) U.S. Cl.
CPC ... *H04N 21/44218* (2013.01); *H04L 65/1083* (2013.01); *H04L 65/4084* (2013.01); *H04N 21/25841* (2013.01); *H04N 21/25875* (2013.01); *H04N 21/25891* (2013.01); *H04N 21/43615* (2013.01)

(58) Field of Classification Search
None
See application file for complete search history.

(56) References Cited

U.S. PATENT DOCUMENTS

| | | | | |
|---|---|---|---|---|
| 8,676,175 | B2* | 3/2014 | Cheng | H04W 4/21 455/414.1 |
| 9,467,359 | B1* | 10/2016 | Januszewski | H04L 43/0876 |
| 2006/0123081 | A1* | 6/2006 | Baudino | G06Q 30/02 709/204 |
| 2007/0067808 | A1* | 3/2007 | DaCosta | H04N 7/17318 725/62 |
| 2007/0136488 | A1* | 6/2007 | Cho | H04N 7/163 709/231 |
| 2007/0291694 | A1* | 12/2007 | Zhang | H04L 67/14 370/331 |
| 2008/0081558 | A1* | 4/2008 | Dunko | G11B 27/002 455/41.1 |
| 2009/0133051 | A1* | 5/2009 | Hildreth | H04N 5/4403 725/28 |
| 2010/0027966 | A1* | 2/2010 | Harrang | H04N 5/775 386/241 |
| 2010/0154021 | A1* | 6/2010 | Howarter | H04N 21/4126 725/141 |
| 2010/0156627 | A1 | 6/2010 | Kennedy | |

(Continued)

FOREIGN PATENT DOCUMENTS

WO    WO-2014/209674 A1    12/2014

*Primary Examiner* — Alexander Q Huerta
(74) *Attorney, Agent, or Firm* — McDermott Will & Emery LLP (57) ABSTRACT

A system and method is disclosed for migrating media content between different devices based on user location. A display screen is configured to detect a presence of a user at the display screen. In response to the detecting the user, media content being provided for the user at a different display screen remote from the first display screen is determined. The determined media content is then provided for broadcast at the display screen starting at a content location associated with the different display screen.

17 Claims, 5 Drawing Sheets

(56) References Cited

U.S. PATENT DOCUMENTS

| | | | |
|---|---|---|---|
| 2011/0163939 A1* | 7/2011 | Tam | G06F 3/1454 |
| | | | 345/2.3 |
| 2012/0030632 A1* | 2/2012 | McRae | G06F 3/017 |
| | | | 715/863 |
| 2012/0072944 A1* | 3/2012 | Felt | H04N 21/47214 |
| | | | 725/25 |
| 2012/0117193 A1* | 5/2012 | Phillips | H04W 4/00 |
| | | | 709/219 |
| 2012/0291060 A1* | 11/2012 | Relyea | H04N 21/4126 |
| | | | 725/25 |
| 2013/0051755 A1* | 2/2013 | Brown | H04N 21/25875 |
| | | | 386/241 |
| 2013/0300644 A1* | 11/2013 | Chen | G06F 3/017 |
| | | | 345/156 |
| 2013/0347044 A1* | 12/2013 | Lee | H04N 21/2387 |
| | | | 725/88 |
| 2014/0026170 A1* | 1/2014 | Francisco | H04L 12/2834 |
| | | | 725/80 |
| 2014/0105561 A1* | 4/2014 | Chen | H04N 21/647 |
| | | | 386/200 |
| 2014/0215533 A1* | 7/2014 | Bhogal | H04N 21/4147 |
| | | | 725/74 |
| 2014/0313167 A1* | 10/2014 | Cohen | H04W 4/21 |
| | | | 345/175 |
| 2014/0325371 A1* | 10/2014 | Wilson | G06F 3/0487 |
| | | | 715/739 |
| 2015/0185856 A1* | 7/2015 | Liu | H04N 21/4126 |
| | | | 345/173 |
| 2015/0193069 A1* | 7/2015 | Di Censo | G06F 3/017 |
| | | | 345/173 |

* cited by examiner

MEDIA CONTENT MIGRATION BASED ON USER LOCATION

TECHNICAL HELD

The subject technology relates generally to providing media content for broadcast a media devices.

BACKGROUND

Many families have multiple television screens and other types of media devices within their home for consuming media content. A media device may generally remain fixed in a particular location white a consumer of media content provided by the device moves to other areas in which the media content may no longer be consumed. A new device capable of providing the media content may be in one of these areas. If the consumer wishes to continue consuming the media content he or she must turn on the new media device and then navigate to the last known location of the media content on the new media device.

SUMMARY

The subject technology provides a system and computer-implemented method for migrating media content between different devices based on user location. In one or more implementations, a computer-implemented method comprises detecting a presence of a user at a first media broadcasting device, in response to the detecting and without user interaction, determining media content being provided for the user at a second media broadcasting device remote from the first media broadcasting device, identifying, within the determined media content, a content location associated with the second media broadcasting device; and providing the determined media content for broadcast at the first media broadcasting device starting at the content location. Other aspects include corresponding systems, apparatuses, and computer program products for implementation of the computer-implemented method.

In one or more implementations, a system comprises one or more computing devices configured to receive an indication that a user has moved from a first media broadcasting device to a second media broadcasting device, in response to receiving the indication, determine media content being provided for the user at a first media broadcasting device and a content location, within the determined media content, associated with the first broadcasting device, and provide the determined media content for broadcast to the second media broadcasting device starting at the content location. Other aspects include corresponding apparatuses, methods, and computer program products for implementation of the foregoing system.

In one or more implementations, a machine-readable media includes instructions that, when executed, perform a method comprising detecting a presence of a user at a first media broadcasting device, determining that the user has moved to the first media broadcasting device from a second media broadcasting device, in response to the determining and without user interaction, determining media content being provided for the user at the second media broadcasting device, determining, within the determined media content, a content location associated with the second media broadcasting device, and providing the determined media content for broadcast at the first media broadcasting device starting at the content location.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology automatically migrates media content between media devices to enable a user to continually consume media while relocating to new areas. Media devices associated with the user may be configured to identify the user, and other users within a predetermined area proximate to the device. Each device may be associated with one or more user profiles, and each profile may comprise, e.g., biometric information for identifying respective users of the device. Biometric information may include, e.g., a fingerprint or a voice print or facial features to be used by a voice or facial recognition system. In this manner, each device may, without user intervention, identify and match users to a stored profile using information received by the device. In one or more implementations, a media device may identify a user in response to a user signal, such as a predetermined gesture on entering the area associated with the device. Additionally or in the alternative, identification of a user may be based on automatic pairing of a mobile device associated with the user.

Multiple media devices may be associated with a user profile so that each device has access to media content provided to the user associated with the user profile. As media content is provided to the user, the user profile may be updated along with a content identifier for the media content so that all devices associated with the user profile may identify the media content being provided to the user. In response to detecting the presence of a user at a first device, the first media device may access the user profile to determine the media content being provided for the user at a second media device remote from the first media device. The first media device may then automatically (without user interaction) begin broadcasting the media content. The current content location within the media content may also be updated periodically in the user profile so that media devices may begin broadcasting the media content at a last known content location.

In one or more implementations, the media content provided to each device may be provided from one or more media servers, e.g., in the data cloud. The media servers may have access to or be associated with a service that manages user profiles and vice versa. In this manner, a user profile associated with a media device may receive license keys or the like for content provided by media servers. The media servers, e.g., may include a license server that provides digital rights management for content provided by the media servers. A user may manage and/or purchases media licenses and have those licenses be associated with the user's user profile. Additionally or in the alternative, when media content is provided from a media server, the user profile may be periodically updated with the content identifier for the content, without user intervention, by the media server.

In one or more implementations, when the user enters an area proximate to a media device that is currently broadcasting media content, the media content currently being provided to the user at another location may be displayed side-by-side with the currently broadcast media content on the media device. For example, the new media content may be displayed in picture-in-picture. In one or more implementations, when the user enters the predetermined area, the media device may display a selectable element or menu corresponding to the user on the display screen (e.g., a representation of the user's face may be displayed). The selectable element may then be selected to display media currently associated with the user, and to select the currently associated media for broadcast on the media device.

Additionally, each media device may detect when a user associated with a user profile known by the media device leaves the predetermined area proximate to the media device. Such detection may trigger storage of the current content location within the media content, or may make the media device available for broadcast of other media associated with other users who are detected in the predetermined area.

The subject technology may also provide a mechanism for parental control. For example, each user profile may include content sensitivity information providing boundaries on what types of media content the user may consume. In this regard, a media device detecting the user may determine whether the content currently being broadcast by the device is suitable for the detected user and, if not, pause and/or stop the broadcast of the media content. In one example, if a child enters an area associated with a device broadcasting mature content then the mature content may be stopped while the child is in the area. Similarly, if an adult enters an area associated with a device currently broadcasting child-appropriate media to children then the device may not provide the option of broadcasting adult media content currently being provided to the adult.

Figure 1:
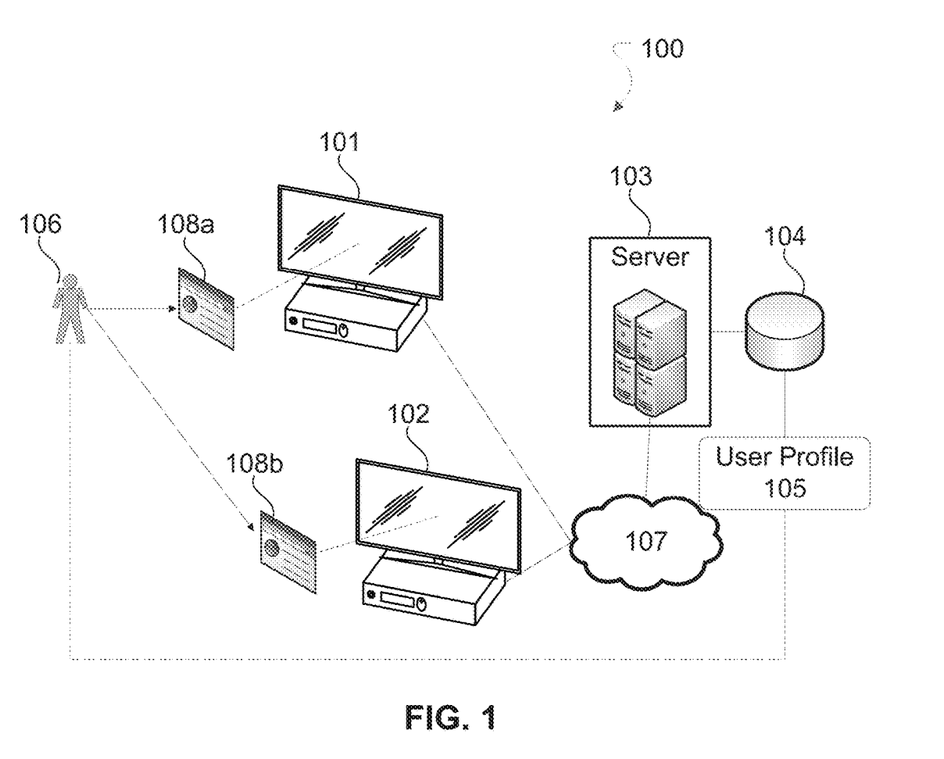
FIG. 1 is a diagram of an example system for migrating media content between different devices based on user location.

FIG. 1 is a diagram of an example system 100 for migrating media content between different devices based on user location, according to one or more aspects of the subject technology. A system 100 may include one or more media broadcasting devices 101, 102, one or more centralized servers 103, and a remote storage 104 (e.g., a database). Media broadcasting devices 101, 102 may be any electronic device configured to broadcast media to a user. For example, media broadcasting devices 101, 102 may include a television or display screen with one or more processors embedded therein or coupled thereto, an audio receiver or similar audio or audio-visual equipment, a media broadcasting device such as a desktop or notebook or tablet computer, or any other sort of computer-related electronic device having connectivity to other devices (e.g., over a network).

Media content, for the purposes of this disclosure, includes content any type of electronically delivered content that may be broadcast to and consumed by a user. Such content includes audio or visual or audio-visual (e.g., multimedia) content. Media content may be delivered by a data stream from a media server remove from media broadcasting devices 101, 102. For example, media content may be a video delivered by an audio-visual (AV) stream from an AV server. The AV stream may be initiated by accessing the AV server using a uniform resource locator (URL) to locate the AV stream associated with the URL. In one or more implementations, the URI, may include a content location (e.g., a time marker) identifying a current location within the media content, so that when the URL is received by the AV server, the AV server may begin streaming the AV stream starting at the content location.

According to various implementations, media broadcasting devices 101 and 102 may be linked to a user profile 105. Accordingly, a user 106 associated with user profile 105 may be authorized to use certain features of a respective device 101, 102 by authenticating to user profile 105. User profile 105 may be, e.g., a cloud-based or web-based user account or may be an enterprise account (e.g., LDAP account), and may function as a universal account for multiple devices. A media broadcasting device 101, 102 may be linked to multiple user profiles, each corresponding to a different user.

Information stored in connection with the user profile may be centrally located on one or more third devices, e.g., on a server 103 (e.g., in a "data cloud"). Accordingly, when data is received, input, or stored on either device 101 or 102, the data may be automatically replicated or co-located to the centrally located user profile on server 103. Similarly, when the centrally located user profile is updated the updated data may be synchronized with all operably connected and/or configured "account-linked" devices, including media broadcasting devices 101, 102.

Server 103 may be operably connected to, e.g., first and second media broadcasting devices 101, 102 over a network 107 (e.g., a LAN, WAN, WiFi, cellular network, or the Internet). Server 103 may also be connected to, or include, one or more media servers or license servers for the management and delivery of media content available to the user associated with user profile 105.

Remote storage 104 may store information in connection with user profile 105. For example, remote storage 104 may store information regarding media content available to the user of user profile 105 including, e.g., media currently being broadcast to one or more of media broadcasting devices 101, 102. The functionality of server 103 and remote storage 104 may be implemented on the same physical server or distributed among a plurality of servers. Moreover, remote storage 104 may take any form such as relational databases, object-oriented databases, file structures, text-based records, or other forms of data repositories.

The various connections between media broadcasting devices 101 and 102, server 103, and storage 104 may be made over a wired or wireless connection. Media broadcasting devices 101 and 102 may be co-located within a defined area. For example, the devices may be connected to the same LAN or WiFi network. User interface 108 may include a touch sensitive display for receiving user input and/or touch-based gestures. Media broadcasting devices 101 and 102 may be in different locations such as in different rooms of a user's home or place of employment. According to various aspects, media broadcasting devices 101 and 102 may be configured to provide one or more user interfaces 108*a*, 108*b* for the broadcast of media content and interaction with one or more users. A user interface 108 may include traditional display screen and/or speakers for the broadcast of media content, augmented by software for interaction with a user in connection with the broadcast of the media content. Media broadcasting devices 101 and 102 may further include one or more user detection features such as a camera or sensor(s) for detection and identification of a user within a predetermined range of the devices.

Each media broadcasting devices 101, 102 may be registered with user profile 105 as an "account-linked" device. Each device 101, 102 may utilize hardware for detecting a user present at the device, and for optionally registering, e.g., bio-identification information with user profile 105 so that account-linked devices may recognize the user when the devices detect the bio-identification information. The bio-identification information may be stored as an encrypted file that may only be used to match the user to the user profile, and the user may have the option to delete the bio-identification information at any time.

Each account-linked device may include sensor hardware (e.g., a camera or microphone) to monitor for and/or capture bio-identification information of users within range of the sensor hardware and match the captured bio-identification information with previously registered bio-identification information associated with user profiles that are linked to the device. In one or more implementations, the bio-identification information may include a voice print or one or more images of a user (e.g., of the user's face). Once a user profile is identified for a user, media information may be retrieved from the profile so that the media broadcast device may begin broadcasting media content for the user.

When the presence of a user is detected, e.g., at first media broadcasting device 101, the device may provide server 103 with an indication that the user is present at the device. Media broadcasting device 101 may identify the user profile 105 and provide server 103 with an identification of the user (e.g., a user token) or may provide server 103 with the bio-identification information or other credential, and server 103 may match the information to user profile 105. Server 103 may then determine that the user has moved from, e.g., media broadcasting device 101 to media broadcasting device 102 by identifying the user profile associated with the user and determining, based on the user profile, that the user is currently associated with an AV stream being provided to media broadcasting device 101. Server 103 may then instruct or authorize media broadcasting device 102 to begin providing the determined media stream.

In one or more implementations, server 103 may periodically receive updates from account-linked media broadcasting devices regarding users that are detected by the devices. In this regard, server 103 may receive an indication that a user has moved between the devices, e.g., from media broadcasting device 101 to media broadcasting device 102 or vice versa. In response to receiving the indication, server 103 may determine media content currently being provided for the user at, e.g., media broadcasting device 101 and a current content location, within the determined media content, associated with broadcasting device 101. The content location may be a current time marker of the media content being provided to media broadcasting device 101 when the user is detected at media broadcasting device 102. In one or more implementations, the current location may be the last time marker recorded while the user was at media broadcasting device 101. Each device may, e.g., periodically determine what users are viewing content provided by the device (e.g., by way of the previously described sensor hardware) and update content locations to the user profile on a periodic basis or when the user is no longer determined to be viewing the content at the device.

Figure 2:
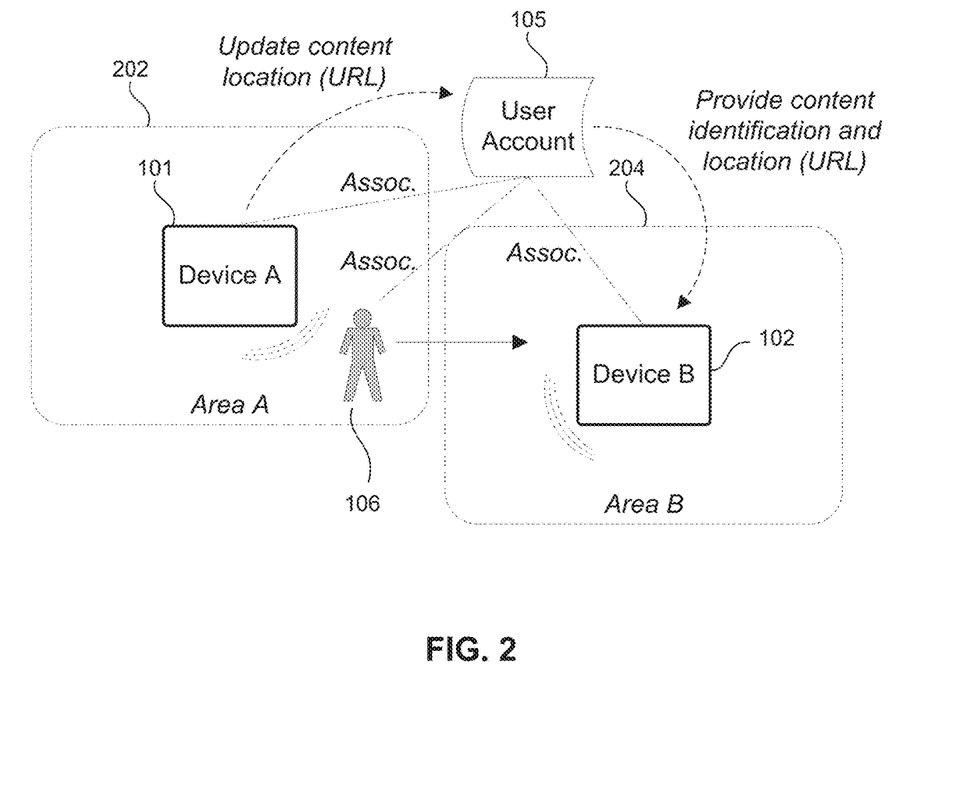
FIG. 2 depicts example components and data flow for migrating media content between different devices based on user location.

FIG. 2 depicts example components and data flow for migrating media content between different devices based on user location. In the depicted example, a first media broadcast device 101 ("Device A") and a second media broadcasting device 102 ("Device B") are associated with (e.g., registered with or linked to) user profile 105, which is also associated with user 106.

Device A and Device B may be configured with hardware to detect the presence of one or more users such as user 106 in a predetermined area 202 ("Area A") or area 204 ("Area B"), respectively. Each predetermined area 202, 204 may be defined by a range of the hardware for detecting the presence of users. For example, the range and/or area may be defined by the range of a wireless signal (e.g., of a local area WiFi network or Bluetooth signal) or the ability of a camera to identify faces or facial expressions and/or the ability of software to process by way of image processing software an image captured by the camera. Additionally or in the alternative, the range may be defined by a closed space such as the dimensions of a room in which the device is positioned, e.g., limiting the geographic range of audio (or visual) reception.

In the depicted example, user 106 may be consuming media content (e.g., watching a video stream) at Device A, and then move out of Area A and into Area B. Device B may then detect the presence of user 106 at Device A. In response to the detecting and without user interaction, Device B determines media content being provided for the user at Device A. Device B may then, without user interaction, start providing the media content to user 106. Device B may also identify a content location within the determined media content at which to start broadcasting the media content starting at the content location.

In one or more implementations, media content such as an AV stream may be associated with a URL for accessing the content. The URL may be stored in user profile 105 to indicate that the user is currently consuming e.g., listening to and/or viewing) the content. As user 106 consumes media content the URL may be updated with a content location corresponding to a current location within the media content at which user 106. When user 106 moves to Device B, the URL may be provided to Device B, and Device B may use the URL to retrieve the media content from a content source.

Figure 3:
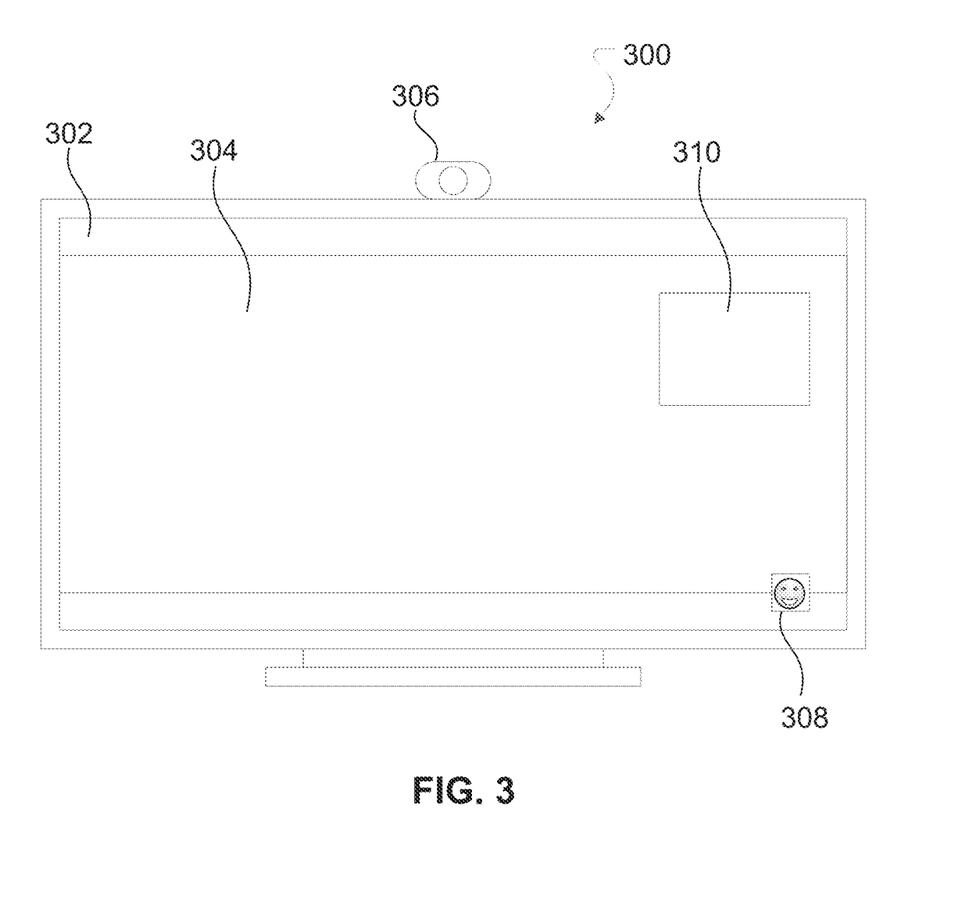
FIG. 3 depicts an example media broadcasting device and associated user interface for broadcasting media content that has been migrated from a different device based on user location.

FIG. 3 depicts an example media broadcasting device 300 and an associated user interface display 302 for broadcasting media content that has been migrated from a different device based on user location. Media broadcasting device 300 may be a television or display screen with one or more processors embedded therein or coupled thereto for providing media content in at least a portion 304 of user interface display 302. Device 300 may be a computing device such as a desktop or notebook or tablet computer, or any other sort of computer-related electronic device having the ability to display media content and transmit data to other similar devices, e.g., through a network. While device 300 is depicted as a display screen, media broadcasting device 300 may be audio and/or visual equipment with or without the ability to provide a display. For example, media broadcasting device 300 may be a home audio system. According to various aspects of this disclosure, media broadcasting device 300 may be representative of media broadcasting device 101 and/or media broadcasting device 102.

Media content determined, e.g., by system 100 for broadcast at the media broadcasting device 300 may be provided by display of the content on user interface display 302. Media broadcasting device 300 may include sensor hardware 306 for detecting users within a predetermined area of device 300. Sensor hardware 306 may be positioned on, or integrated with, device 300. Sensor hardware 306 may include one or more different mechanisms for the detection of users. For example, sensor hardware 306 may include a camera functioning in connection with image recognition software, one or more motion sensors for detecting movement, a fingerprint reader, or a wireless transmitter/receiver for detecting an electronic signal from a mobile device associated with a user.

In one or more implementations, sensor hardware 306 may automatically receive bio-identification information associated with a user when the user approaches or is within a predetermined distance from media broadcasting device 300. For example, sensor hardware 306 may be a camera that captures images and compares the captured images to stored information associated with one or more user profiles linked to device 300. Sensor hardware 306 may work in connection with motion sensors so that images are captured on detecting movement. Additionally or in the alternative, sensor hardware 306 may include one or more microphones that captures audible voice information and compares the captured voice information to stored voice prints associated with the one or more profiles linked to device 300 to identify a user. In one or more implementations, device 300 may be configured to use sensing hardware to detect one or more predetermined user gestures to identify the user.

In one or more implementations, device 300 may be configured to automatically establish a wireless connection between the device 300 and a mobile device located in a geographic area associated device 300, and determine the user is present at device 300 based on the connection or a credential passed over the connection. For example, device 300 may be configured with a NFC (near field communication) technology so that, when a mobile device also configured with NFC technology is within a predetermined distance of device 300, device 300 receives a credential associated with the user of the mobile device via NFC. Device 300 may also be configured with Bluetooth or other low energy technology such that, when a mobile device paired with device 300 enters within signal range of device 300, device 300 establishes a connection with the mobile device and receives a credential associated with the user of the mobile device. Device 300 may receive credentials over a LAN when a mobile device connects (e.g., automatically) to a WiFi access point associated with the LAN. Once the user's credential is received, device 300 may compare and match the credential to a user profile associated with device 300. All of the foregoing connection activity may occur without user intervention.

Media broadcasting device 300 may be currently broadcasting media content when the presence of user 106 is detected. In one or more implementations, device 300 may provide users at device 300 an option to choose between the currently broadcasting media content and newly-determined media content associated with newly-detected user 106. The option may be presented, e.g., by displaying a selectable element 308 on user interface display 302. Selectable element 308 may include, e.g., a representation of user 106 (e.g., a representation of the user's face). Selectable element 308 may then be selected to switch the currently broadcast media content to a broadcast of media currently associated with user 106 (e.g., being migrated from a different device). In one or more implementations, selectable element 108 includes a menu with selections for selecting content associated with user 106, e.g., content currently being broadcast at another device for the user and/or content associated with the user's profile 105.

User 106, or another user at device 300, may then select one of the currently broadcasting media content and the determined media content to be provided at device 300, and device 300 may provide only the selected one of the currently broadcasting media content and the determined media content at device 300. In one or more implementations, the selection may be based on a user gesture detected by sensor hardware 306, without physical interaction by the user with device 300. For example, user 106 may perform a predetermined hand signal to confirm migration to device 300 of media content currently being provided to the user at another device.

In one or more implementations, when user 106 is detected at device 300, device 300 may (at least temporarily) provide the migrated media content in a first portion 310 of user interface display 302 while the currently broadcast media content is provided in a second portion 304 of the display screen.

Media broadcasting device 300 (as part of system 100) may provide certain parental control mechanisms or may restrict access to media content based on user authorization levels. In this regard, if media broadcasting device 300 is currently broadcasting media content when the presence of user 106 is detected, device 300 (or other components of system 100 such as server 103) may determine that user 106 is not authorized to consume the media content currently being broadcast at device 300, and automatically stop the broadcast of the currently broadcasting media content. Device 300 may restart the broadcast upon receiving the appropriate authorization from a user having a predetermined level of authority for authorizing the broadcast of media content. Additionally or in the alternative, device 300 (or other components of system 100 such as server 103) may automatically determine that one or more other users currently associated with consuming media at device 300 are not authorized to consume the newly-migrated media content for user 106, and may not immediately begin broadcast of the newly-migrated media content (e.g., in portion 310). Device 300 may require and then receive authorization for the one or more other users to consume the newly-migrated media content before the media content is broadcast at device 300.

Figure 4:
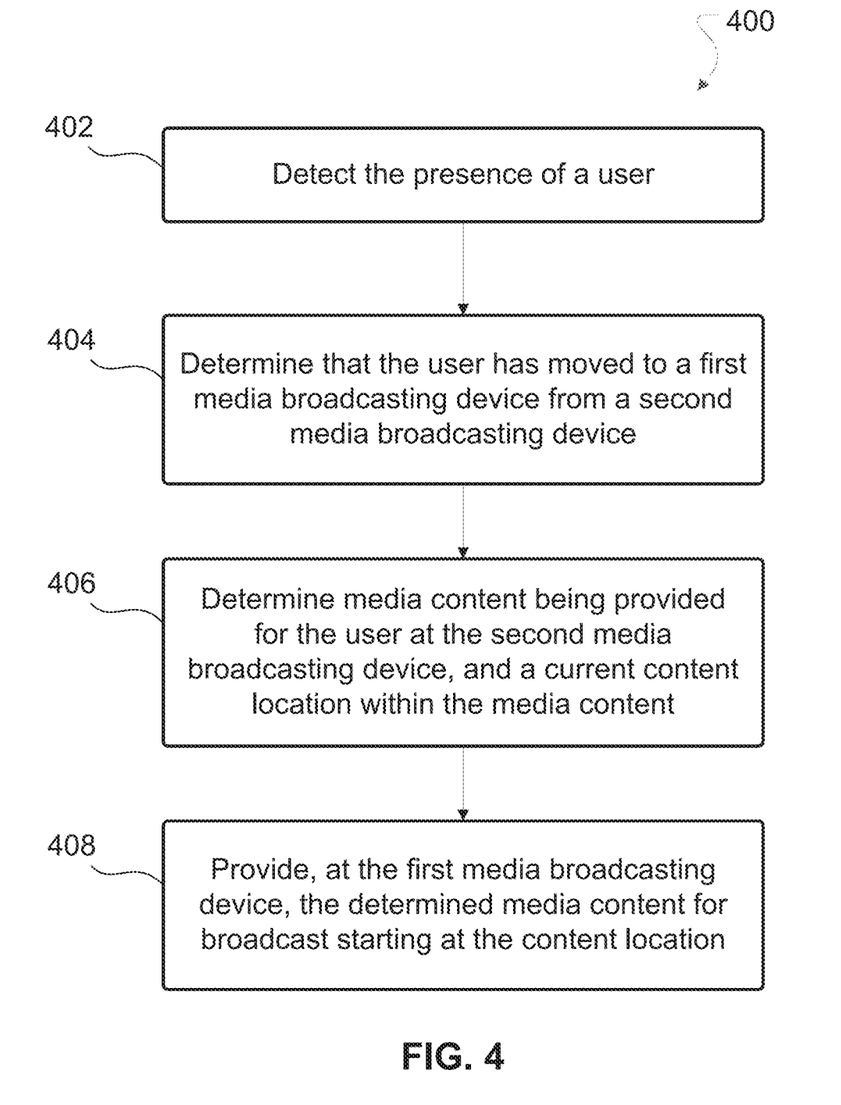
FIG. 4 depicts a flow diagram of an example process for migrating media content between different devices based on user location.

FIG. 4 depicts a flow diagram of an example process 400 for migrating media content between different devices based on user location, according to aspects of the subject technology. For explanatory purposes, example process 400 is described herein with reference to the components of FIG. 1, FIG. 2, and FIG. 3. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, a media broadcasting device 101 detects the presence of a user (402). As described previously, device 101 may detect the presence of a user by way of sensor hardware 306 at device 101. In one or more implementations, detecting the presence of the user includes receiving bio-identification information associated with the user by way of sensor hardware 306, and matching the received bio-identification information to user profile 105. In one or more implementations, sensor hardware 306 may, upon a mobile device associated with the user entering a predetermined range of sensor hardware 306, automatically (e.g., without user intervention) establish a wireless connection between device 101 and the mobile device, and receive a user credential associated with the user of the mobile device. The user credential may be, e.g., a token corresponding to user profile 105. Accordingly, user profile 105 may be identified from, e.g., multiple user profiles linked to device 101 based on the received user credential.

Device 101 and/or server 103 determines that the user has moved to device 101 from, e.g., second media broadcasting device 102 (404). In this regard, device 101 may send a request to server 103 including, e.g., the user identifier (e.g., user credential or token) received from the user or associated with user profile 105. Device 101 may request in return an content identifier of media content currently associated with the user and a current content location within the media content. Server 103 may return the identifier in the form of, e.g., a URL for accessing an AV stream for the media content from a media server. The URL may include the content location embedded therein. In one or more implementations, device 101 may have the media content stored locally, and may begin broadcasting the content based on the received identifier. Based on receipt of the content identifier, device 101 may determine that the user has moved from a different device.

Additionally or in the alternative, server 103, on receiving the user identifier, may make the determination that the user has moved to device 101 from device 102. When the user identifier is received, server 103 may determine (e.g., based on user profile 105) that the user is currently associated with consuming media at device 102. In one or more implementations, server 103 may match the received identifier (e.g., bio-identification information or credential) to user profile 105. In this example, device 101 simply passes a user identifier to the server and the server informs device 101 (e.g., by way of returning the content URL) to begin broadcasting the new media content.

Device 101 and/or server 103 determines media content being provided for the user at media broadcasting device 102, and a current content location within the media content (406). As described previously, a content identifier may be stored in connection with user profile 105. The content identifier, and a corresponding content location, may be updated periodically as the user consumes various media content across one or more devices. When the user is detected at, e.g., device 101, user profile 105 may be queried for media content currently being broadcast for the user, and the content location corresponding to a time when the user was last viewing and/or listening to the media content. As described previously, the media content and content location may be determined together, e.g., from a URL stored within or in connection with user profile 105.

Device 101 provides the determined media content for broadcast starting at the content location (408). Device 101 may provide the determined media content by retrieving an AV stream for the content from a media server based on a content identifier (e.g., URL) received from user profile 105, and then presenting the AV stream in user interface display 302. Server 103 provides the determined media content for broadcast by providing device 101 the content identifier (e.g., URL) for accessing the content.

Device 101 may not immediately begin broadcasting the determined media content to a user upon detection of the user. In one or more implementations, device 101 may provide, e.g., on user interface display 302, an option to choose between a currently broadcasting media content and the determined media content. Device 101 may provide selectable element 308 for selecting between available content items. Device 101 (or server 103 via device 101) may receive a selection of one of the available content items (e.g., currently broadcasting media content and the determined media content), and then begin broadcasting the selected content item. In one or more implementations, a selection of media content may be received by way of a user gesture detected by sensor hardware 306, without physical interaction by the user with device 101. To facilitate selection of media content, device 101 may provide the determined media content as a picture-in-picture, or side by side with currently broadcasting media content, within user interface display 302.

In one or more implementations, device 101 may be currently broadcasting media content when the presence of the user is detected. Device 101, based on user authorization levels (e.g., such as parental control settings) may automatically determine whether the currently broadcasting media content should be immediately switched to the new determined media content or whether the new media content should be immediately displayed, e.g., in picture-in-picture. For example, in response to detecting a new user, device 101 may determine that the user is not authorized to consume the currently broadcasting media content. In this case, device 101 may stop the broadcast of the currently broadcasting media content until the appropriate authorization is received. Authorization may be received, e.g., by way of identification of an authorized user using sensor hardware 306, by a predetermined gesture, or by entry of user credential (e.g., username and/or password).

Likewise, device 101 may determine that one or more users currently present at device 101 are not authorized to consume the determined media content associated with a newly-detected user at device 101. Device 101 may then request authorization to allow the users to consume the determined media content before the determined media content is broadcast or provided at the device.

Many of the features in the above-described example process 400, and related applications, may be implemented as software processes that are specified as a set of instructions recorded on a computer readable storage medium also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media, by itself, does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
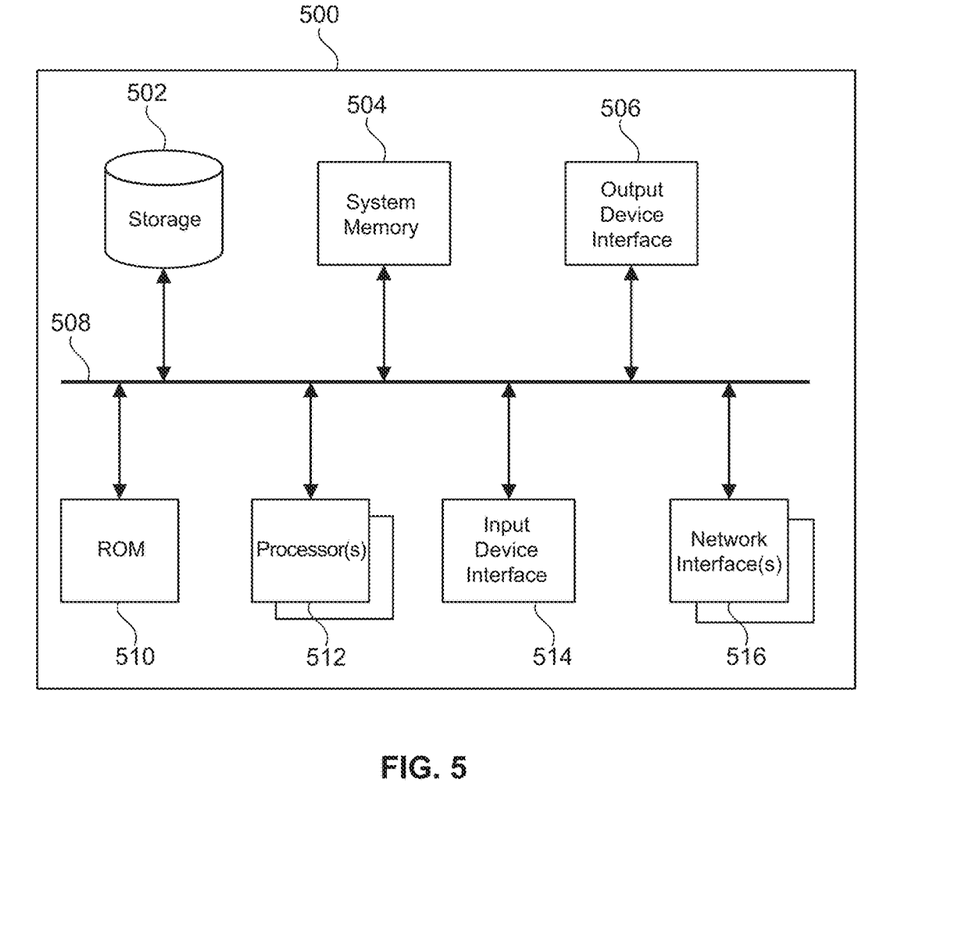
FIG. 5 is a diagram depicting an example electronic system for use in connection with migrating media content between different devices based on user location.

FIG. 5 is a diagram illustrating an example electronic system 500 for use in connection with migrating media content between different devices based on user location, according to one or more aspects of the subject technology. Electronic system 500 may be a computing device for execution of software associated with the operation of computing device 100, or one or more portions or steps of process 400, or components and processes provided by FIGS. 1-4. In various implementations, electronic system 500 may be representative of first or second media broadcasting device 101, 102, or server 103. In this regard, electronic system 500 may be a personal computer or a mobile device such as a tablet computer, laptop, smartphone, PDA, or other touch screen or television with one or more processors embedded therein or coupled thereto, or any other sort of computer-related electronic device having wireless connectivity.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510, From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, e.g., alphanumeric keyboards and pointing devices (also called "cursor control devices"). Input device interface 514 may also include sensor hardware 306. Output device interfaces 506 enables, e.g., the display of images generated by the electronic system 500. Output devices used with output device interface 506 include, e.g., printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, e.g., a wireless access point (e.g., Bluetooth or WiFi) or radio circuitry for connecting to a wireless access point. Network interfaces 516 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   detecting a first user gesture at a first media broadcasting device;
   in response to the detecting, identifying a user profile associated with a user based on the first user gesture, wherein identifying the user profile occurs without further user interaction;
   determining media content provided for the user at a second media broadcasting device remote from the first media broadcasting device based on a content identifier stored in connection with the user profile;
   identifying, within the determined media content, a time marker associated with the second media broadcasting device stored in connection with the user profile;
   providing, for display, an interface comprising an option to choose between a currently broadcasting media content at the first media broadcasting device and the determined media content;
   receiving a selection of one of the currently broadcasting media content or the determined media content based on a second user gesture, wherein the second user gesture is detected by the first media broadcasting device, and is independent of the second media broadcasting device; and
   providing the selected one of the currently broadcasting media content or the determined media content for broadcast at the first media broadcasting device starting at the time marker.

2. The computer-implemented method of claim 1, wherein determining the media content provided for the user and identifying the time marker comprises:
   receiving, based on the user profile, the content identifier and the time marker of the media content.

3. The computer-implemented method of claim 1, further comprising:
   registering the first media broadcasting device with the user profile before the first user gesture is detected,
   wherein the determined media content is provided at the first media broadcasting device based on a media data stream provided by one or more media servers remote from the first media broadcasting device.

4. The computer-implemented method of claim 1, further comprising:
   receiving bio-identification information associated with the user at the first media broadcasting device,
   wherein the user profile is identified based on the received bio-identification information.

5. The computer-implemented method of claim 1, further comprising:
   establishing, without user intervention, a wireless connection between the first media broadcasting device and a mobile device located in a geographic area associated with the first media broadcasting device; and
   receiving a user credential associated with the user of the mobile device,
   wherein the user profile is identified based on the received user credential.

6. The computer-implemented method of claim 1, wherein the determined media content is provided in a first portion of a display screen of the first media broadcasting device while the currently broadcast media content is provided in a second portion of the di splay screen.

7. The computer-implemented method of claim 1, wherein the first media broadcasting device is currently broadcasting media content when the first user gesture is detected, the method further comprising:
   in response to the detecting and without user interaction, determining that the user is not authorized to consume the currently broadcasting media content, and stopping the broadcast of the currently broadcasting media content.

8. The computer-implemented method of claim 1, further comprising:

determining that one or more other users currently associated with consuming media at the first media broadcasting device are not authorized to consume the determined media content; and receiving authorization for the one or more other users to consume the determined media content based on a third user gesture from the user.

9. A system, comprising:
one or more computing devices configured to:
receive an indication that a first user gesture is detected at a second media broadcasting device;
in response to receiving the indication, identify a user profile associated with a user based on the first user gesture, wherein identifying the user profile occurs without further user interaction;
determine media content provided for the user at a first media broadcasting device and a time marker, within the determined media content, associated with the first media broadcasting device based on a content identifier stored in connection with the user profile;
provide, for display, an interface comprising an option to choose between a currently broadcasting media content at the first media broadcasting device and the determined media content;
receive a selection of one of the currently broadcasting media content or the determined media content based on a second user gesture, wherein the second user gesture is detected by the first media broadcasting device, and is independent of the second media broadcasting device; and
provide the selected one of the currently broadcasting media content or the determined media content for broadcast to the second media broadcasting device starting at the time marker.

10. The system of claim 9, wherein the one or more computing devices are further configured to:
determine, based on the user profile, when the indication is received, that the user is currently associated with consuming media at the first media broadcasting device.

11. The system of claim 9, wherein the one or more computing devices are further configured to:
receive bio-identification information associated with the user at the second media broadcasting device, wherein the user profile is identified based on the received bio-identification information.

12. The system of claim 9, wherein the one or more computing devices are further configured to:
receive, from the second media broadcasting device, a user credential associated with the user of a mobile device, wherein the user profile is identified based on the received user credential.

13. The system of claim 9, wherein the one or more computing devices are further configured to:
register the first media broadcasting device and the second media broadcasting device with the user profile before detecting the first user gesture at the second media broadcasting device,
wherein the determined media content is provided to the second media broadcasting device based on a media data stream provided by one or more media servers remote from the first and second media broadcasting devices.

14. The system of claim 9, wherein one or more computing devices are further configured to:
stop the determined media content from being provided at a first media broadcasting device in connection with providing the determined media content for broadcast to the second media broadcasting device.

15. The system claim 9, the one or more computing devices further being configured to:
determine that the user is not authorized to consume the media content; and
stop the broadcast of the media content at the second media broadcasting device in response to determining that the user is not authorized.

16. A machine-readable media including instructions that, when executed, perform a method comprising:
detecting a first user gesture at a first media broadcasting device;
identifying a user profile associated with a user when the first user gesture is detected, wherein identifying the user profile occurs without further user interaction;
determining media content provided for the user at a second media broadcasting device based on a content identifier stored in connection with the user profile;
determining, within the determined media content, a time marker-associated with the second media broadcasting device in connection with the user profile;
providing, for display, an interface comprising an option to choose between a currently broadcasting media content at the first media broadcasting device and the determined media content;
receiving a selection of one of the currently broadcasting media content or the determined media content based on a second user gesture, wherein the second user gesture is detected by the first media broadcasting device, and is independent of the second media broadcasting device; and
providing the selected one of the currently broadcasting media content or the determined media content for broadcast at the first media broadcasting device starting at the time marker.

17. The machine-readable media of claim 16, wherein the method further comprises:
registering the first media broadcasting device with the user profile before the first user gesture is detected,
wherein the determined media content is provided based on a media data stream from one or more media servers remote from the first media broadcasting device.

* * * * *